(12) United States Patent
Jang

(10) Patent No.: US 8,918,852 B2
(45) Date of Patent: *Dec. 23, 2014

(54) METHOD OF AUTHENTICATION USER USING SERVER AND IMAGE FORMING APPARATUS USING THE METHOD

(71) Applicant: Samsung Electronics Co., Ltd., Suwon-si, Gyeonggi-do (KR)

(72) Inventor: Woo-yeon Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,647

(22) Filed: Aug. 1, 2013

(65) Prior Publication Data

US 2013/0314737 A1    Nov. 28, 2013

Related U.S. Application Data

(63) Continuation of application No. 12/173,240, filed on Jul. 15, 2008, now Pat. No. 8,522,325.

(30) Foreign Application Priority Data

Sep. 5, 2007  (KR) ........................ 10-2007-0089965

(51) Int. Cl.
| | |
|---|---|
| H04L 29/06 | (2006.01) |
| G06F 21/33 | (2013.01) |
| H04N 1/44 | (2006.01) |
| H04N 1/00 | (2006.01) |

(52) U.S. Cl.
CPC .............. *H04N 1/4413* (2013.01); *G06F 21/33* (2013.01); *H04L 63/08* (2013.01); *H04N 1/00856* (2013.01); *G06F 2221/2115* (2013.01)
USPC .............................................. 726/7; 713/182

(58) Field of Classification Search
None
See application file for complete search history.

(56) References Cited

U.S. PATENT DOCUMENTS

| | | |
|---|---|---|
| 6,826,692 B1 | 11/2004 | White |
| 2002/0041394 A1 | 4/2002 | Aoki |
| 2003/0191799 A1 | 10/2003 | Araujo et al. |
| 2003/0200465 A1 | 10/2003 | Bhat et al. |
| 2005/0108530 A1 | 5/2005 | Tonegawa |
| 2005/0171914 A1 | 8/2005 | Saitoh |

FOREIGN PATENT DOCUMENTS

KR    2003-0093610    12/2003

OTHER PUBLICATIONS

Korean Office Action dated Nov. 28, 2011 issued in corresponding Korean Patent Application No. 10-2007-0089965.

(Continued)

*Primary Examiner* — David Le
(74) *Attorney, Agent, or Firm* — Staas & Halsey LLP

(57) ABSTRACT

A method of authenticating a user using a server and an image forming apparatus using the same, the method including: transmitting, from an image forming apparatus to a first server that functions as an authentication server, user authentication information; determining if the first server authenticates the user based on the user authentication information; and transmitting, to a second server that processes image data, the user authentication information if the first server authenticates the user, wherein the second server authenticates the user based on the transmitted user authentication information authenticated by the first server. Thus, the user of the image forming apparatus can be automatically authenticated by the second server by authenticating the user on the first server.

23 Claims, 5 Drawing Sheets

(56) References Cited

OTHER PUBLICATIONS

U.S. Office Action issued Oct. 5, 2011 in copending U.S. Appl. No. 12/173,240.

U.S. Office Action issued Mar. 5, 2012 in copending U.S. Appl. No. 12/173,240.

U.S. Notice of Allowance issued Apr. 24, 2013 in copending U.S. Appl. No. 12/173,240.

U.S. Appl. No. 12/173,240, filed Jul. 15, 2008, Woo-yeon Jang, Samsung Electronics Co., Ltd.

METHOD OF AUTHENTICATION USER USING SERVER AND IMAGE FORMING APPARATUS USING THE METHOD

CROSS-REFERENCE TO RELATED APPLICATIONS

This application is a continuation of U.S. application Ser. No. 12/173,240, filed Jul. 15, 2008, now pending, which is based on and claims all benefits accruing under 35 U.S.C. §119 from Korean Patent Application No. 2007-89965, filed on Sep. 5, 2007, in the Korean Intellectual Property Office, the disclosure of which is incorporated herein by reference.

BACKGROUND

1. Field

Aspects of the present invention relate to a method of authenticating a user using a server and an image forming apparatus applying the same, and more particularly, to a method of authenticating a user using a server adopting a server message block (SMB) protocol and an image forming apparatus applying the same.

2. Description of the Related Art

An active directory is a type of a lightweight directory access protocol (LDAP) directory service provided by Microsoft Corporation and conventionally used in the Windows operating system environment. Specifically, the active directory provides authentication and authorization services to Windows-based computers. The LDAP requests and revises a directory service. The LDAP, which requests and revises a directory service, is a software protocol that aids in finding the positions of organizations, individuals, or resources (such as files or devices) that are provided on a network (such as the Internet or an enterprise intranet). An active directory server is a server that provides an active directory service, and employs the LDAP.

A server message block (SMB) server is a server using an SMB protocol, which is a network protocol used to share access to files and printer serial ports on a network. Using the SMB protocol, it is possible to share files or printers between a UNIX-like server and a Windows client in a local area network (LAN) environment.

FIG. 1 is a block diagram of a conventional active directory server 110, an SMB server 120, and a multifunctional peripheral (MFP) 100 that can receive an authentication result from a server 110 and 120.

Referring to FIG. 1, the MFP 100 receives authentication information (such as an identification (ID) and a password) and additional information (such as a domain name) from a user and transmits the ID and the password to the active directory server 110. Thereafter, if the active directory server 110 authenticates the user and sends an authentication result to the MFP 100, the MFP 100 transmits an additional ID, password, and domain name to the SMB server 120. If the additional ID, password, and domain name are authenticated by the SMB server 120, the MFP 100 transmits data to be processed by the SMB server 120.

The active directory server 110 determines if the user using the MFP 100 is a proper user based on the ID and password received from the MFP 100 and transmits the determination result to the MFP 100. Similarly, the SMB server 120 determines if the user using the MFP 100 is a proper user based on the ID, password, and domain name received from the MFP 100, and transmits the determination result to the MFP 100.

FIG. 2 is a flowchart of a conventional method of authenticating a user using a server and transmitting an authentication result to an MFP 100. Referring to FIGS. 1 and 2, in operation 200, the MFP 100 receives authentication information (such as a user ID and a password) and additional information (such as a domain name) via an interface.

In operation 210, the MFP transmits the received ID and password to an active directory server 110. In response, the MFP 100 receives an authentication result from the active directory server 110 in operation 220.

In operation 230, the MFP 100 determines if the active directory sever 110 successfully authenticates the user based on the received authentication result. If the user is not successfully authenticated by the active directory server 110 (operation 230), the method returns back to operation 200.

Conversely, if the user is successfully authenticated by the active directory server 110 (operation 230), the MFP 100 transmits an additionally stored ID and password along with a domain name to an SMB server 120 in operation 240.

In response, the MFP 100 receives an authentication result from the SMB server 120 and determines if the user is successfully authenticated by the SMB server 120 based on the authentication result in operation 250. If the user is not successfully authenticated by the SMB server 120 (operation 250), the method returns back to operation 200.

Conversely, if the user is successfully authenticated by the SMB server 120 (operation 250), the MFP 100 transmits data to the SMB server 120 in operation 260.

In the above-described conventional method, after receiving the authentication result from the active directory server 110, the MFP 100 transmits a different ID and password to the SMB server 120 (i.e., different than the ID and password transmitted to the active directory server 110). Thus, when authentication information necessary for the MFP 100 to be authenticated by the SMB server 120 is periodically changed, it is inconvenient for a manager to continuously revise authentication information of a plurality of MFPs, and thus, a user should be separately authenticated by the active directory server 110 and the SMB server 120.

SUMMARY

Several aspects and example embodiments of the present invention provide a method of authenticating a user using a server and an image forming apparatus using the method. Specifically, after the user is authenticated by an authentication server, the user authentication information used to successfully authenticate on the authentication server is also used to authenticate on an image data processing server. Thus, when the user is successfully authenticated on the authentication server, the user may also be successfully authenticated by the image data processing server, for processing image data in an image forming apparatus, conveniently.

Additional aspects and/or advantages of the invention will be set forth in part in the description which follows and, in part, will be obvious from the description, or may be learned by practice of the invention.

According to an aspect of the present invention, there is provided a method of authenticating a user of an image forming apparatus using a first server to authenticate the user and a second server to process image data of the image forming apparatus, the method including: transmitting, from the image forming apparatus to the first server, user authentication information; determining if the first server authenticates the user based on the user authentication information; and transmitting, to the second server, the user authentication information if the first server authenticates the user based on the user authentication information, wherein the second server processes the image data of the image forming apparatus if the second server authenticates the user based on the transmitted user authentication information.

According to another aspect of the present invention, there is provided an image forming apparatus to generate image data using a first server to authenticate a user of the image forming apparatus and a second server to process the image data, the image forming apparatus including: a user interface unit to receive user authentication information from the user; an authentication control unit to determine if the first server authenticates the user based on the user authentication information transmitted to the first server; and a network interface unit to transmit the user authentication information to the first server, and to transmit the user authentication information to the second server if the authentication control unit determines that the first server authenticates the user based on the transmitted user authentication information, wherein the second server processes the image data of the image forming apparatus if the second server authenticates the user based on the transmitted user authentication information, and the second server does not process the image data of the image forming apparatus if the second server fails to authenticate the user based on the transmitted user authentication information.

According to another aspect of the present invention, there is provided a computer-readable recording medium having embodied thereon a computer program for executing the foregoing method of authenticating the user on the server.

According to yet another aspect of the present invention, there is provided a method of authenticating a user of an image forming apparatus using a first server to authenticate the user and a second server to process image data of the image forming apparatus, the method including: transmitting, from the image forming apparatus to the first server, user authentication information; attempting, in the first server, to authenticate the user based on the transmitted user authentication information; determining if the first server authenticates the user based on the user authentication information; transmitting, to the second server, the user authentication information if the first server authenticates the user based on the user authentication information; attempting, in the second server, to authenticate the user based on the transmitted user authentication information; and processing, in the second server, the image data of the image forming apparatus if the second server authenticates the user based on the transmitted user authentication information, and not processing, in the second server, the image data of the image forming apparatus if the second server fails to authenticate the user based on the transmitted user authentication information.

According to still another aspect of the present invention, there is provided a system to process image data after authenticating a user, the system including: an image forming apparatus to generate image data and to transmit user authentication information of a user; a first server to receive the user authentication information transmitted by the image forming apparatus, and to authenticate the user based on the user authentication information; and a second server to receive the user authentication information if the first server successfully authenticates the user based on the user authentication information, to authenticate the user based on the user authentication information, to process the image data if the second server successfully authenticates the user based on the user authentication information, and to not process the image data if the second server fails to authenticate the user based on the user authentication information.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION

Figure 1:
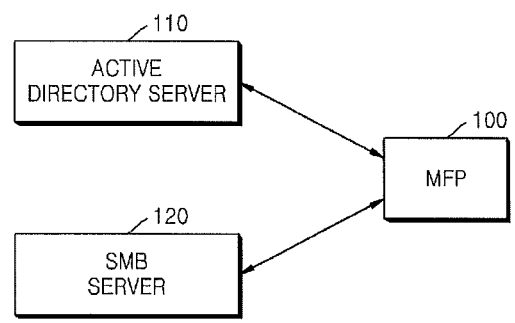
FIG. 1 is a block diagram of a conventional active directory server, a server message block (SMB) server, and a multifunctional peripheral (MFP) that can receive an authentication result from a server.
Figure 2:
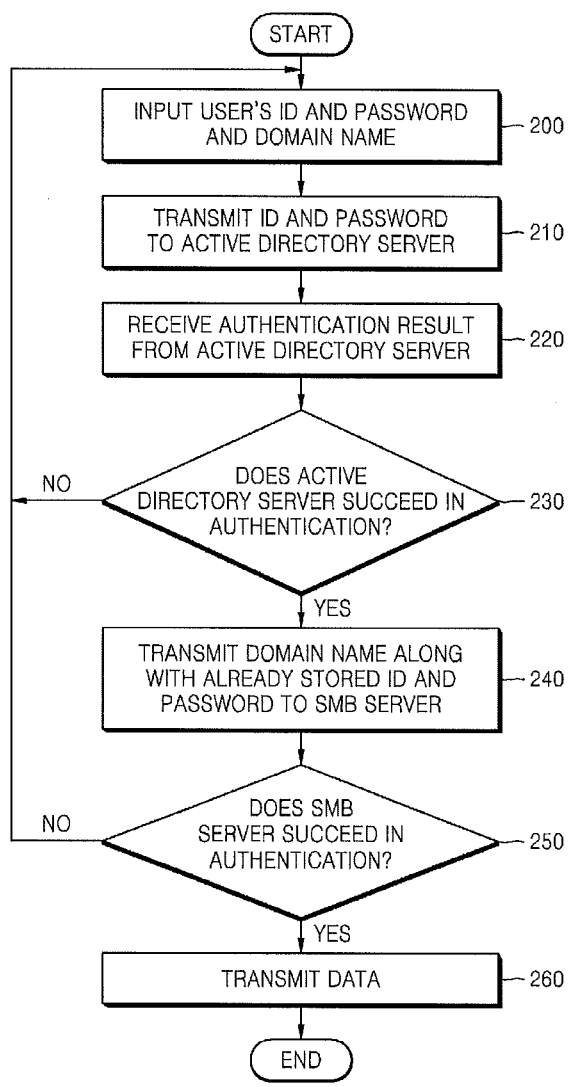
FIG. 2 is a flowchart of a conventional method of authenticating a user using a server and transmitting an authentication result to an MFP.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
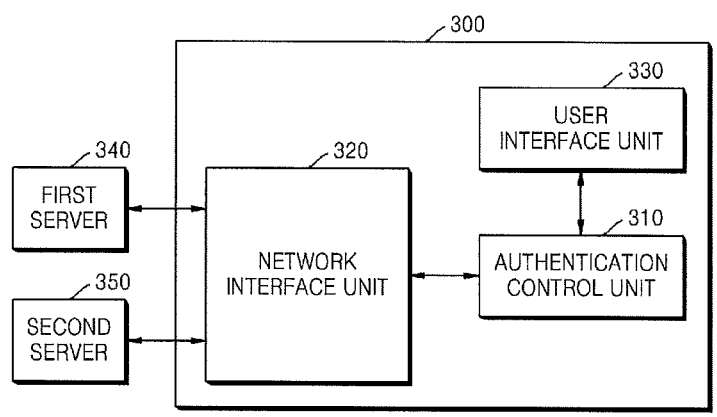
FIG. 3 is a block diagram of an image forming apparatus according to an example embodiment of the present invention.

FIG. 3 is a block diagram of an image forming apparatus 300 according to an example embodiment of the present invention. Referring to FIG. 3, the image forming apparatus 300 includes an authentication control unit 310, a network interface unit 320, and a user interface unit 330.

The authentication control unit 310 determines if a first server 340 (such as an active directory server) authenticates the user based on user authentication information (such as a user ID and a password) transmitted to the first server 340. If it is determined that the first server 340 authenticates the user, the authentication control unit 310 controls to transmit the user authentication information to a second server 350 (such as a server message block (SMB) server).

If the second server 350 fails to authenticate the user based on the user authentication information authenticated by the first server 340, the authentication control unit 310 controls to transmit new user authentication information to the second server 350. In this case, the new user authentication information may be transmitted to the authentication control unit 310 via the user interface unit 330. Alternatively, the new user authentication information may be previously set for transmission to the second server 350 if the second server 350 fails to authenticate the user based on the user authentication information authenticated by the first server 340. If the second server 350 requires additional information (such as a domain name) for authentication, the authentication control unit 310 controls to transmit an additional information request signal to the first server 340, receives the additional information from the first server 340, and controls to transmit the additional information to the second server 350.

The network interface unit 320 transmits user authentication information to the first server 340 and the second server 350 in response to a control signal output from the authentication control unit 310, and receives an authentication result corresponding to the user authentication information from the first server 340 and the second server 350.

The user interface unit 330 receives user authentication information from a user. For example, if the second server 350 fails to authenticate the user based on the user authentication information authenticated by the first server 340, the user interface unit 330 may receive the new user authentication information from the user under the control of the authentication control unit 310.

The first server 340 is a server that authenticates the user prior to the second server 350. For example, if the image forming apparatus 300, according to the present example embodiment, is a scan apparatus, the user is authenticated by the first server 340 before the image forming apparatus 300 generates scan data, or before the image forming apparatus 300 transmits generated scan data to the second server 350.

The second server 350 is a server that receives predetermined image data from the image forming apparatus 300 according to the present example embodiment and processes the image data. For example, when the image forming apparatus 300 is a scan apparatus, the image forming apparatus 300 may output scan data to a server message block (SMB) server, a file transfer protocol (FTP) server, or an e-mail server as the second server 350. The image data of the image forming apparatus 300 may include at least one of scan data, printer data, received facsimile data, and previously stored data. An SMB protocol is a network protocol used to share access to files and printer serial ports on a network. By use of the SMB protocol, it is possible to share files or printers between a UNIX-like server and a Windows client in a local area network (LAN) environment. The SMB server is a server using the SMB protocol.

Figure 4:
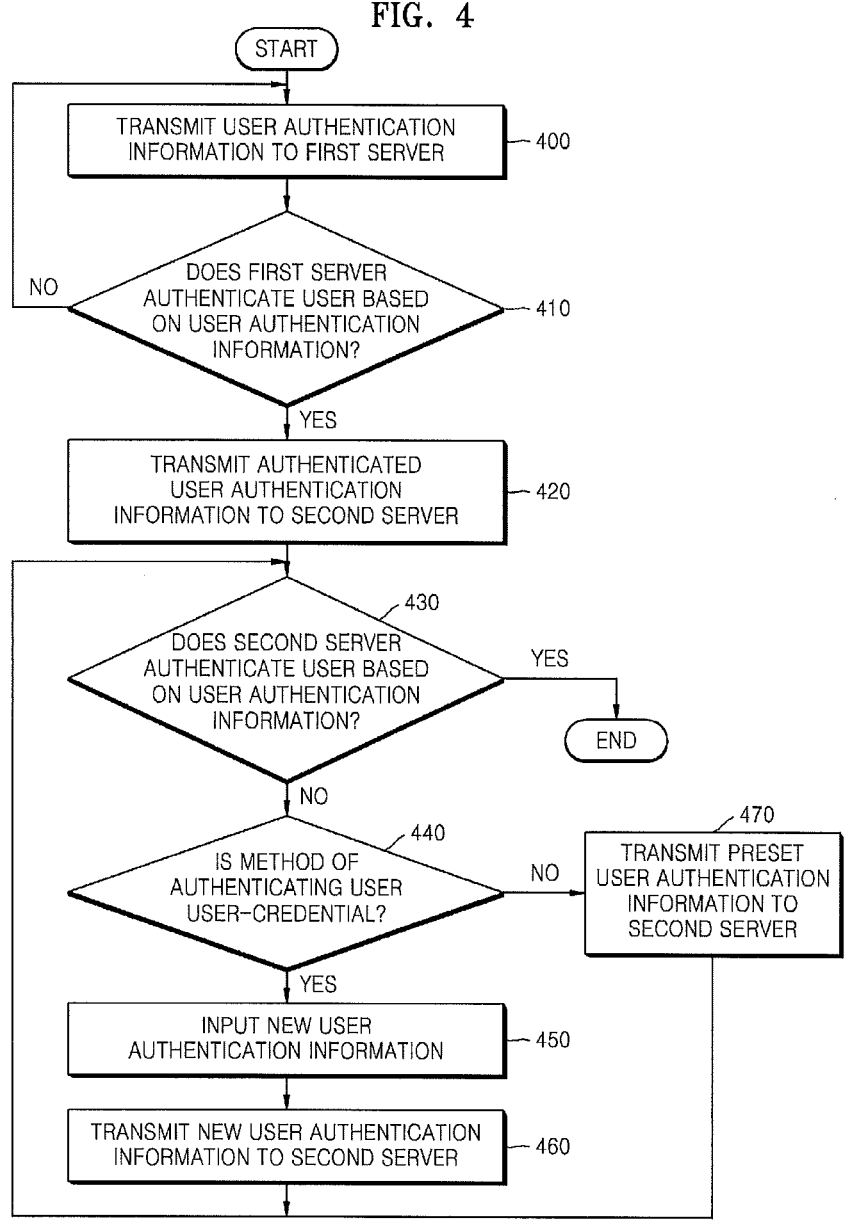
FIG. 4 is a flowchart of a method of authenticating a user using a server according to an example embodiment of the present invention.

FIG. 4 is a flowchart of a method of authenticating a user using a server according to an example embodiment of the present invention. Hereinafter, the method of authenticating a user using a server according to the example embodiment of the present invention will be described with reference to FIGS. 3 and 4.

Referring to FIGS. 3 and 4, in operation 400, the image forming apparatus 300 receives user authentication information from a user and transmits the user authentication information to the first server 340. The first server 340 is a server that authenticates the user prior to the second server 350. For example, when the image forming apparatus 300 is a scan apparatus, the user is authenticated by the first server 340 before the image forming apparatus 300 generates scan data. Accordingly, unless the first server 340 authenticates the user, the user cannot access the second server 350. The first server 340 may be an active directory server that may employ a lightweight directory access protocol (LDAP).

In operation 410, the image forming apparatus 300 determines if the user is authenticated by the first server 340. Specifically, the first server 340 authenticates the user of the image forming apparatus 300 based on the user authentication information that is transmitted from the image forming apparatus 300 in operation 400, and transmits an authentication result to the image forming apparatus 300. If the image forming apparatus 300 determines that the user is not authenticated by the first server 340 (for example, by receiving an authentication-failure signal from the first server 340), the image forming apparatus 300 returns back to operation 400.

If the image forming apparatus 300 determines that the user is authenticated by the first server 340 in operation 410 (for example, by receiving an authentication-success signal from the first server 340), the image forming apparatus 300 may further transmit an additional information request signal to the first server 340. Additional information refers to information that is separately used according to the type of the second server 350. The additional information may include, for example, a domain name and an e-mail address of the image forming apparatus 300. Since the additional information used by the second server 350 to authenticate the user may vary according to the type of the second server 350, the image forming apparatus 300 may allow the user to input required additional information and/or request, from the first server 340, additional information that can be requested by the second server 350. Therefore, the image forming apparatus 300 transmits the additional information request signal to the first server 340 since the second server 350 may sometimes require not only authentication information (such as an ID and a password), but also additional information to authenticate the user. For example, an SMB server requires a domain name in addition to the authentication information (such as the ID and the password) during an authentication process. When the first server 340 is an active directory server using an LDAP, the image forming apparatus 300 may transmit an LDAP query as a domain name request signal to the first server 340. After the image forming apparatus 300 receives a domain name from the first server 340, the image forming apparatus 300 may store the domain name in an additional storage unit (not shown).

If the image forming apparatus 300 determines that the user is authenticated by the first server 340 in operation 410, the image forming apparatus 300 receives a transmission command from the user. That is, the image forming apparatus 300 may receive new user authentication information from the user and transmit the new user authentication information to the second server 350 in response to a first command, transmit preset user authentication information to the second server 350 in response to a second command, or transmit the user authentication information authenticated by the first server 340 to the second server 350 in response to a third command.

If the user inputs the third command to transmit the user authentication information authenticated by the first server 340 to the second server 350, the image forming apparatus 300 transmits the user authentication information authenticated by the first server 340 to the second server 350. If the first server 340 transmits the domain name to the image forming apparatus 300 in response to the domain name request signal, the image forming apparatus 300 transmits the domain name in addition to the user authentication information authenticated by the first server 340 to the second server 350.

In operation 430, the image forming apparatus 300 receives an authentication result from the second server 350 that receives the user authentication information in operation 420, and determines whether the second server 350 authenticates the user. If the image forming apparatus 300 determines that the second server authenticates the user (for example, by receiving an authentication-success signal from the second server 350), the image forming apparatus 300 finishes authentication. If the image forming apparatus 300 determines that the second server 350 fails to authenticate the user (for example, by receiving an authentication-failure signal from the second server 350), the image forming apparatus 300 proceeds to operation 440.

If the second server 350 fails to authenticate the user in operation 430, before the image forming apparatus 300 proceeds to operation 440, the second server 350 may receive new user authentication information from the user and transmit the new user authentication information to the first server 340. In this case, the image forming apparatus 300 repeats operations 400 through 430 using the new user authentication information.

In operation 440, the image forming apparatus 300 determines if the failed method of authenticating the user by the second server 350 is a user credential method. The method of authenticating the user by the second server 350 may be classified as a user credential or a system credential method. The user credential method is a method of authenticating a user based on user authentication information that the user inputs (for example, by opening a floating pop-up window) at a user interface. The system credential method is a method of authenticating a user based on preset user authentication information that is to be transmitted when a user fails to be authenticated by a server. User authentication information in the system credential method is called system authentication information. The user may select one of the user credential and the system credential methods as a method of authenticating a user by the second server 350, input the selected method to the image forming apparatus 300, and store the selected method in the additional storage unit (not shown). Thus, the image forming apparatus 300 may determine if the authentication method by the second server 350 is the user credential method based on the selected method stored in the additional storage unit.

If the image forming apparatus 300 determines that the failed method of authenticating the user by the second server 350 is the user credential method, the image forming apparatus 300 proceeds to operation 450. If the image forming apparatus 300 determines that the failed method of authenticating the user by the second server 350 is the system credential method, the image forming apparatus 300 proceeds to operation 470. Specifically, if the failed method is the system credential method, the image forming apparatus 300 has already received and stored authentication information (such as an ID and a password) from the user. Furthermore, if an SMB server (as opposed to an FTP server and an e-mail server) uses the system credential method as the method of authenticating the user, the SMB server must additionally receive a domain name from the user and store the domain name.

If the method of authenticating the user by the second server 350 is the user credential method in operation 440, the image forming apparatus 300 receives new user authentication information from the user via the user interface unit 330 in operation 450. For example, the authentication control unit 310 may send a control signal to the user interface unit 330 so that the user interface unit 330 opens a floating pop-up window and allows the user to input predetermined user authentication information via the floating pop-up window. It is understood that other input methods aside from a floating pop-up window may be used in other embodiments of the present invention.

In operation 460, the image forming apparatus 300 transmits the new user authentication information (input in operation 450) to the second server 350 that authenticates the user using the user credential method as determined in operation 440.

If the method of authenticating the user by the second server 350 is the system credential method in operation 440, the image forming apparatus 300 transmits preset user authentication information to the second server 350 that authenticates the user in operation 470.

Figure 5:
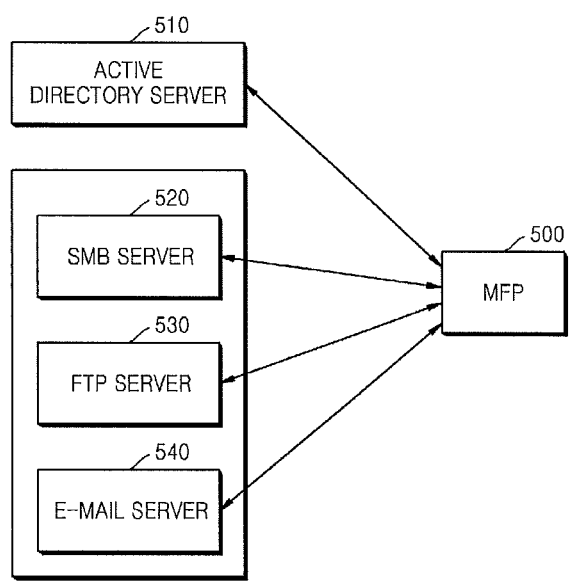
FIG. 5 is a block diagram of servers and an MFP to explain a method of authenticating a user using a server according to an example embodiment of the present invention.

FIG. 5 is a block diagram of an active directory server 510, an SMB server 520, an FTP server 530, an e-mail server 540, and a multifunctional peripheral (MFP) 500 to explain a method of authenticating a user using a server according to an example embodiment of the present invention.

Referring to FIG. 5, if a user of the MFP 500 wants to perform a scan operation using the MFP 500, the user must be authenticated by the active directory server 510. The scan operation is used in the present description as a non-limiting example, and it is understood that other operations of an MFP 500 may be applied. Specifically, the user inputs user authentication information (such as an ID and a password) and transmits the ID and password to the active directory server 510. In this case, when the MFP 500 receives an authentication-success signal from the active directory server 510, the user authentication information authenticated by the active directory server 510 is transmitted to at least one server selected by the user of the MFP 500 from among the SMB server 520, the FTP server 530, and the e-mail server 540. In this case, unlike the FTP server 530 and the e-mail server 540, the SMB server 520 requires not only the ID and the password, but also a domain name of the MFP 500 to authenticate the user. Accordingly, after the active directory server 510 authenticates the user, the MFP 500 requests a domain name from the active directory server 510 and receives the domain name in order to authenticate the user by the SMB server 520.

After the user authentication information and the domain name are transmitted to the SMB server 520, the user can perform the desired scan operation using the SMB server 520 if the user is authenticated by the SMB server 520. Another user may also input user authentication information (such as an ID and a password) to the MFP 500, so that the other user can be authenticated by the active directory server 510, and then be authenticated by the SMB server 520 using the user authentication information authenticated by the active directory server 510 and the domain name of the MFP 500.

However, after the MFP 500 transmits the user authentication information to the SMB server 520, if the SMB server 520 fails to authenticate the user, the MFP 500 determines if an authentication method of the SMB server 520 is a user credential method or a system credential method. If it is determined that the method of authenticating the user by the SMB server 520 is the user credential method, the MFP 500 allows the user to input new user authentication information via a user interface, and transmits the new user authentication information to the SMB server 520. By comparison, if it is determined that the method of authenticating the user by the SMB server 520 is the system credential method, the MFP 500 transmits, to the SMB server 520, preset user authentication information that is stored therein to be transmitted when the SMB server 520 fails to authenticate the user. In the case of the user credential method, the user interface may continuously receive new user authentication information until the SMB server 520 succeeds to authenticate the user.

The embodiments of the present invention can be written as computer programs and can be implemented in general-use digital computers that execute the programs using a computer-readable recording medium. Also, data used in the embodiments of the present invention can be recorded on the computer-readable recording medium using a variety of units. Examples of the computer-readable recording medium include magnetic storage media (e.g., ROMs, floppy disks, hard disks, etc.), and optical recording media (e.g., CD-ROMs, or DVDs).

In a method of authenticating a user using a server and an image forming apparatus according to the example embodiments of the present invention, user authentication information, which is used by an authentication server to authenticate the user, and additional information of the image forming apparatus are used to authenticate the user by an image data processing server. Accordingly, a user of the image forming apparatus can be automatically authenticated by the image data processing server by authenticating the user in the authentication server. When the image data processing server fails to authenticate the user, the image forming apparatus may receive additional user authentication information from the user or utilize preset user authentication information. Thus, even if user authentication information stored in the image data processing server is changed, the image forming apparatus can additionally provide the user with a method of authenticating the user by the image data processing server.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the authentication control unit 310 and the network interface unit 320 can be implemented as a single control module to perform the functions as described. Furthermore, the method of authenticating the user may be set by default, as opposed to input by a user as described with reference to FIG. 4. Furthermore, the method of authenticating a user may always be set to a user-credential method. Accordingly, it is intended, therefore, that the present invention not be limited to the various example embodiments disclosed, but that the present invention includes all embodiments falling within the scope of the appended claims.

What is claimed is:

1. A method of authenticating a user of an image forming apparatus using a first server to authenticate the user and a second server to process image data of the image forming apparatus, the method comprising:
   transmitting, from the image forming apparatus to the first server, user authentication information;
   determining if the first server authenticates the user based on the user authentication information; and
   transmitting, to the second server, the user authentication information if the first server authenticates the user based on the user authentication information,
   wherein the image forming apparatus transmits an additional information request signal to the first server if the second server requires additional information for authentication, and transmits the additional information to the second server,
   wherein the second server processes the image data of the image forming apparatus if the second server authenticates the user based on the transmitted user authentication information and the additional information.

2. The method as claimed in claim 1, further comprising transmitting, from the image forming apparatus to the second server, new user authentication information if the second sever fails to authenticate the user based on the user authentication information authenticated by the first server,
   wherein the second server processes the image data of the image forming apparatus if the second server authenticates the user based on the transmitted new user authentication information.

3. The method as claimed in claim 2, further comprising receiving the new user authentication information from the user if the second sever fails to authenticate the user based on the user authentication information authenticated by the first server.

4. The method as claimed in claim 1, further comprising:
   transmitting, from the image forming apparatus to the first server, new user authentication information if the second server fails to authenticate the user based on the transmitted user authentication information;
   determining if the first server authenticates the user based on the new user authentication information; and
   transmitting, to the second server, the new user authentication information if the first server authenticates the user based on the new user authentication information,
   wherein the second server processes the image data of the image forming apparatus if the second server authenticates the user based on the transmitted new user authentication information.

5. The method as claimed in claim 4, further comprising receiving the new user authentication information from the user if the second sever fails to authenticate the user based on the user authentication information authenticated by the first server.

6. The method as claimed in claim 2, wherein the new user authentication information is preset user authentication information intended to be transmitted to the second server if the second server fails to authenticate the user based on the user authentication information authenticated by the first server.

7. The method as claimed in claim 1, wherein the transmitting of the user authentication information to the second server comprises:
   receiving, from the user, a first command to receive new user authentication information from the user and to transmit the new user authentication information to the second server, a second command to transmit preset user authentication information intended to be transmitted to the second server, or a third command to transmit the user authentication information authenticated by the first server to the second server;
   transmitting, to the second server, the new user authentication information if the first command is received from the user;
   transmitting, to the second server, the preset user authentication information if the second command is received from the user; and
   transmitting, to the second server, the user authentication information if the third command is received from the user.

8. The method as claimed in claim 1, wherein the first server is an active directory server using a lightweight directory access protocol (LDAP).

9. The method as claimed in claim 8, wherein the image forming apparatus is a scan apparatus, and the second server is a server using a server message block (SMB) protocol, a file transfer protocol (FTP) protocol server, or an e-mail server.

10. The method as claimed in claim 1, wherein the user authentication information includes an identification (ID) and a password.

11. The method as claimed in claim 1, wherein the second server is a server using an SMB protocol, and the additional information includes a domain name of the image forming apparatus.

12. The method as claimed in claim 1, wherein the image data of the image forming apparatus is scan data, print data, facsimile data, or previously stored data.

13. An image forming apparatus to generate image data using a first server to authenticate a user of the image forming apparatus and a second server to process the image data, the image forming apparatus comprising:
a user interface unit configured to receive user authentication information from the user;
an authentication control unit configured to determine if the first server authenticates the user based on the user authentication information transmitted to the first server; and
a network interface unit configured to transmit the user authentication information to the first server, and to transmit the user authentication information to the second server if the authentication control unit determines that the first server authenticates the user based on the transmitted user authentication information,
wherein the authentication control unit controls the network interface unit to transmit an additional information request signal to the first server if the second server requires additional information for authentication, and controls the network interface unit to transmit the additional information to the second server,
wherein the second server processes the image data of the image forming apparatus if the second server authenticates the user based on the transmitted user authentication information and the additional information.

14. The apparatus as claimed in claim 13, wherein: if the second server fails to authenticate the user based on the user authentication information authenticated by the first server, the network interface unit transmits new user authentication information to the second server; and the second server processes the image data of the image forming apparatus if the second server authenticates the user based on the transmitted new user authentication information.

15. The apparatus as claimed in claim 14, wherein the user interface unit receives the new user authentication information from the user if the second server fails to authenticate the user based on the user authentication information authenticated by the first server.

16. The apparatus as claimed in claim 13, wherein:
if the second server fails to authenticate the user based on the user authentication information authenticated by the first server, the network interface unit transmits new user authentication information to the first server;
the authentication control unit determines if the first server authenticates the user based on the new user authentication information;
the network interface unit transmits the new user authentication information to the second server if the first server authenticates the user based on the new user authentication information; and
the second server processes the image data of the image forming apparatus if the second server authenticates the user based on the transmitted new user authentication information.

17. The apparatus as claimed in claim 14, wherein the new user authentication information is preset user authentication information intended to be transmitted to the second server if the second server fails to authenticate the user based on the user authentication information authenticated by the first server.

18. The apparatus as claimed in claim 13, wherein:
if the first sever authenticates the user based on the user authentication information, the user interface unit receives from the user a first command to receive new user authentication information from the user and to transmit the new user authentication information to the second server, a second command to transmit preset user authentication information intended to be transmitted to the second server, or a third command to transmit the user authentication information authenticated by the first server to the second server;
the network interface unit transmits the new user authentication information to the second server if the user interface unit receives the first command from the user;
the network interface unit transmits the preset user authentication information to the second server if the user interface unit receives the second command from the user; and
the network interface unit transmits the user authentication information to the second server if the user interface unit receives the third command from the user.

19. The apparatus as claimed in claim 13, wherein the first server is an active directory server using a lightweight directory access protocol (LDAP).

20. The apparatus as claimed in claim 13, wherein the image data is scan data, print data, received facsimile data, or previously stored data.

21. A method of authenticating a user of an image forming apparatus using a first server to authenticate the user and a second server to process image data of the image forming apparatus, the method comprising:
transmitting, from the image forming apparatus to the first server, user authentication information and an additional information request signal;
attempting, in the first server, to authenticate the user based on the transmitted user authentication information;
determining if the first server authenticates the user based on the user authentication information;
receiving, at the image forming apparatus an additional information from the first server;
transmitting, to the second server, the user authentication information and the additional information if the first server authenticates the user based on the user authentication information;
attempting, in the second server, to authenticate the user based on the transmitted user authentication information and the additional information; and
processing, in the second server, the image data of the image forming apparatus if the second server authenticates the user based on the transmitted user authentication information and the additional information.

22. A system to process image data after authenticating a user, the system comprising:
an image forming apparatus to generate image data and to transmit user authentication information of a user, an additional information request signal and an additional information;
a first server to receive the user authentication information and the additional information request signal transmitted by the image forming apparatus, and to authenticate the user based on the user authentication information, and to transmit the additional information to the image forming apparatus; and
a second server to receive the user authentication information and the additional information transmitted by the image forming apparatus if the first server successfully authenticates the user based on the user authentication information, to authenticate the user based on the user authentication information and the additional information, to process the image data if the second server successfully authenticates the user based on the user authentication information and the additional information.

23. A non-transitory computer-readable recording medium having embodied thereon a computer program for executing the method of claim 1.

\* \* \* \* \*